(12) United States Patent
Zhao et al.

(10) Patent No.: US 11,504,685 B1
(45) Date of Patent: Nov. 22, 2022

(54) PROCESSING EQUIPMENT AND PROCESSING TECHNOLOGY OF GEL MICROSPHERE MATERIAL

(71) Applicant: SUZHOU YISHENG OPTICAL MATERIAL CO., LTD., Suzhou (CN)

(72) Inventors: Jiang Zhao, Suzhou (CN); Dawei Tian, Suzhou (CN); Jianfei Zhu, Suzhou (CN); Dong Shen, Suzhou (CN); Xin Zhao, Suzhou (CN)

(73) Assignee: SUZHOU YISHENG OPTICAL MATERIAL CO., LTD., Suzhou (CN)

( * ) Notice: Subject to any disclaimer, the term of this patent is extended or adjusted under 35 U.S.C. 154(b) by 0 days.

(21) Appl. No.: 17/721,483

(22) Filed: Apr. 15, 2022

(30) Foreign Application Priority Data

Sep. 27, 2021 (CN) .......................... 202111132782.0

(51) Int. Cl.
*B01J 13/00* (2006.01)
*B01J 19/18* (2006.01)
*B01F 33/453* (2022.01)
*B01J 2/04* (2006.01)

(52) U.S. Cl.
CPC .............. *B01J 2/04* (2013.01); *B01J 13/0091* (2013.01); *B01F 33/453* (2022.01); *B01J 19/18* (2013.01)

(58) Field of Classification Search
CPC combination set(s) only.
See application file for complete search history.

(56) References Cited

U.S. PATENT DOCUMENTS

2005/0145728 A1* 7/2005 Huttlin ...................... B01J 8/386
241/18

FOREIGN PATENT DOCUMENTS

| CN | 1142221 C | 3/2004 |
|---|---|---|
| CN | 1872826 A | 12/2006 |
| CN | 203635204 U | 6/2014 |
| CN | 104857905 A | 8/2015 |
| CN | 204685096 U | 10/2015 |
| CN | 106349466 A | 1/2017 |
| CN | 208427040 U | 1/2019 |
| CN | 112573575 A | 3/2021 |

(Continued)

*Primary Examiner* — Mary Lynn F Theisen

(57) ABSTRACT

The present disclosure belongs to the technical field of gel material processing, and discloses processing equipment and a processing technology of a gel microsphere material. The processing equipment comprises a mixing barrel, wherein a motor is installed at the top of the mixing barrel; a rotating rod is arranged in the mixing barrel; the rotating rod is fixedly connected to the output end of the motor; a fan-shaped impeller is installed at the bottom end of the rotating rod; the bottom of the rotating rod communicates with a gas conveying pipe; a shunting ring is fixedly connected to the inner side wall of the mixing barrel; the bottom of the rotating rod is fixedly connected with the fan-shaped impeller; and the gas conveying pipe is arranged at the bottom of the mixing barrel to inflate a raw material solution in the mixing barrel, when bubbles float in the solution, the solution can be stirred, and then under the cooperation of the fan-shaped impeller at the bottom of the rotating rod, the raw material solution of the gel microsphere material is stirred more quickly and more uniformly in the mixing barrel compared with the raw material solution only stirred by the fan-shaped impeller.

11 Claims, 7 Drawing Sheets

(56) References Cited

FOREIGN PATENT DOCUMENTS

| | | |
|---|---|---|
| CN | 113145046 A | 7/2021 |
| CN | 113230985 A | 8/2021 |

\* cited by examiner

S1, vacuumizing the interior of a mixing barrel 1, then filling inert gas, and sealing the mixing barrel 1 after filling is completed;

S2, filling raw materials needing to be mixed into the mixing barrel 1 from a feeding port, and when the top of the liquid level of the raw materials in the mixing barrel 1 overflows the top of the shunting ring 13, stopping injecting the raw materials needing to be mixed;

S3, turning on a power supply of the processing equipment, enabling a fan-shaped impeller 14 to rotate at a constant speed in the mixing barrel 1 at normal temperature, standing for 0.5 hour after the raw materials in the mixing barrel 1 are uniformly stirred, and thus obtaining a microsphere primary blank solution.

FIG. 7

PROCESSING EQUIPMENT AND PROCESSING TECHNOLOGY OF GEL MICROSPHERE MATERIAL

CROSS REFERENCE TO RELATED APPLICATION

This patent application claims the benefit and priority of Chinese Patent Application No. 202111132782.0 filed on Sep. 27, 2021, the disclosure of which is incorporated by reference herein in its entirety as part of the present application.

TECHNICAL FIELD

The present disclosure belongs to the technical field of gel material processing, and specifically relates to processing equipment and a processing technology of a gel microsphere material.

BACKGROUND ART

Gel microspheres, also known as microspherical aerogels and different from common bulk aerogels, belong to a new material of special structure, and are constructed by nanoscale materials in microscale dimensions (typically between 1-1000 μm).

Some technical schemes about gel materials also appear in the prior art, for example, a Chinese patent with the publication number of CN1142221C discloses a thermotropic shape memory gel material and a preparation method thereof, and the gel material comprises a compound composed of a polyelectrolyte gel network and a cationic surfactant, wherein substances for synthesizing the polyelectrolyte network comprise an anionic electrolyte and a cross-linking agent.

At present, in the preparation process of the gel microsphere material in the prior art, raw materials need to be uniformly dispersed by a homogenizer, then a QCS water-phase solution is added and uniformly stirred, QCS is ammonium chitosan, and in long-time preparation observation, it is found that in an existing stirring device for the gel microsphere material, a fan-shaped impeller is used for mixing, and the mixing mode is single, so that the mixing and stirring time of the gel microsphere material is long.

SUMMARY

In order to overcome the defects in the prior art and solve the problem that in the preparation process of a gel microsphere material, raw materials need to be uniformly dispersed by using a homogenizer, and then a QCS water-phase solution is added to be uniformly stirred, the present disclosure provides processing equipment and a processing technology of a gel microsphere material.

The technical scheme adopted for solving the technical problem of the present disclosure is as follows:

The present disclosure provides processing equipment of a gel microsphere material, comprising a mixing barrel, wherein a motor is installed at the top of the mixing barrel; a rotating rod is arranged in the mixing barrel; the rotating rod is fixedly connected to the output end of the motor; a fan-shaped impeller is arranged at the bottom of the rotating rod; the bottom of the rotating rod communicates with a gas conveying pipe; a shunting ring is fixedly connected to the inner side wall of the mixing barrel; and the middle part of the rotating rod penetrates through the shunting ring, and the bottom end of the rotating rod extends to the bottom of the shunting ring;

The middle part of the rotating rod is fixedly connected with a first magnet; a cavity is formed in the shunting ring; a second magnet is fixedly connected into the cavity through an elastic pull rope; magnetic poles of the first magnet and the second magnet are arranged correspondingly, and a rubber cushion block is fixedly connected into the shunting ring; a swing rod is hinged to the inner side wall of the shunting ring; one side of the swing rod extends into the cavity; the end part of the swing rod is fixedly connected with a flow guide plate; and the magnetic poles of the first magnet and the second magnet are arranged correspondingly and can be different at opposite postures, so that mutual attraction or mutual exclusion is achieved.

Production raw materials are added into the mixing barrel from a feeding port of the mixing barrel, meanwhile, the liquid level of the added production raw materials is higher than the shunting ring, then the motor at the top of the mixing barrel is opened, the rotating rod drives the fan-shaped impeller to rotate clockwise in the mixing barrel, at the moment, a raw material solution in the mixing barrel flows in the shunting ring from top to bottom, and then repeated cycles are achieved; meanwhile, a valve of the gas conveying pipe is opened, gas enters the bottom of the mixing barrel, at the moment, the gas can float from bottom to top in the raw materials, the raw materials in the mixing barrel are stirred, and the gas conveying pipe is arranged at the bottom of the mixing barrel to inflate the raw material solution in the mixing barrel; and when bubbles float in the solution, the solution can be stirred, and under the cooperation with the fan-shaped impeller at the bottom of the rotating rod, the raw material solution of the gel microsphere material is stirred more quickly and more uniformly in the mixing barrel compared with the raw material solution only stirred by the fan-shaped impeller.

When the motor at the top of the mixing barrel rotates reversely, the rotating direction of the fan-shaped impeller in the mixing barrel rotates reversely at the same time, at the moment, the fan-shaped impeller sucks the raw material solution in the mixing barrel from the bottom of the fan-shaped impeller and sends the raw material solution to the interior of the shunting ring, and the flowing direction of the raw material solution for preparing microspheres can be reversed in the mixing barrel.

Meanwhile, in the rotating process of the rotating rod, when the first magnet rotates, different magnetic poles can be switched to influence the second magnet, and when the first magnet rotates to the side where the first magnet and the second magnet are attracted to each other, the second magnet can be close to the rotating rod in the cavity; then, when the first magnet rotates to the side where the first magnet and the second magnet are mutually exclusive, the second magnet moves towards the side far away from the rotating rod in the cavity, the second magnet vibrates in the shunting ring under the multiple times of reciprocation, and at the moment, the shunting ring vibrates and mixes the solution in the mixing barrel; meanwhile, bubbles floating from the gas conveying pipe cannot be easily adsorbed on the shunting ring, and then the problem that the stirring effect is affected is solved; and through the arrangement of the rubber cushion block, when the second magnet vibrates, the second magnet and the rubber cushion block collide and contact with each other, so that the shaking effect generated by the second magnet is directly conducted to the shunting ring.

The swing rod is hinged to the interior of the shunting ring, so that the solution can impact the flow guide plate while flowing in the shunting ring, the swing rod is transversely arranged in the middle of the shunting ring, and at the moment, the flow guide plate shunts the solution flowing through the shunting ring, so that the solution flowing through the shunting ring is mixed at the second time; at the moment, the other end of the swing rod is in contact with the second magnet, so that the vibration amplitude of the second magnet is reduced, but the vibration effect can be directly transmitted to the shunting ring and the flow guide plate, so that the vibration of the shunting ring is more stable; moreover, the flow guide plate can vibrate together, so that the solution flowing through the flow guide plate can be vibrated and mixed for multiple times; the mixing speed and the mixing uniformity of the solution are further improved; meanwhile, when the rotating rod rotates reversely and the gas conveying pipe stops conveying gas, the flowing direction of the solution in the shunting ring is opposite to the above flowing direction, at the moment, the swing rod is pushed, the other end of the swing rod leaves the second magnet, and the shaking amplitude of the second magnet in the cavity is larger; and bubbles in the solution in the mixing barrel are vibrated out, so that the volume of residual bubbles in the solution after the solution is mixed is reduced.

Further, flow guide blocks are fixedly connected to the inner side wall of the bottom of the mixing barrel; the flow guide blocks are symmetrically arranged at the bottom of the mixing barrel; and in the process that the raw material solution of the microspheres flows in the mixing barrel, the solution can realize up-and-down backflow in the mixing barrel under the guidance of the flow guide blocks at the bottom of the mixing barrel, so that when the solution flows up and down in the mixing barrel, part of the solution rotates at the bottom boundary of the mixing barrel to cause the problem that the solution in the mixing barrel can not be fully mixed.

Further, a first piston cavity is formed in the shunting ring; a piston rod is slidably connected into the first piston cavity; the end part of the piston rod faces the rotating rod; the end part of the piston rod is fixedly connected with a shunting block; a Y-shaped flow guide cavity is formed in the shunting block; the shunting block is arranged on the inner side wall of the bottom of the shunting ring, when the solution flows, the solution can be dispersed at an outlet in the bottom of the shunting ring, when the liquid flowing downwards from the shunting ring impacts the fan-shaped impeller, multiple beams of solution are formed, and meanwhile, vibration of the shunting ring is transmitted out when the first magnet rotates, the shunting block can slightly shake, the solution flowing through the shunting block can be mixed for multiple times, and further, the solution can be mixed more uniformly when flowing downwards from the shunting ring; the Y-shaped flow guide cavity is formed in the shunting block, the two ends of the top of the Y-shaped flow guide cavity are formed in the two sides of the shunting block, then an outlet is formed in the middle of the shunting block in a fusion mode, and the outlet communicates with the bottom of the shunting block.

Further, a swing ball is arranged in the Y-shaped flow guide cavity; a first elastic pull rope is connected between the swing ball and the Y-shaped flow guide cavity; the swing ball is arranged in the Y-shaped flow guide cavity, when the solution flows in from the top of the Y-shaped flow guide cavity and flows out from the bottom of the Y-shaped flow guide cavity, the swing ball rushes out from the bottom of the Y-shaped flow guide cavity, and at the moment, the swing ball swings at the bottom of the Y-shaped flow guide cavity; meanwhile, the swing ball also shakes at the bottom of the shunting block while the shunting block shakes; and the solution flowing out from the bottom of the Y-shaped flow guide cavity is vibrated and mixed, and the mixing uniformity of all raw materials in the solution is accelerated.

Further, a plurality of groups of second piston cavities are formed in the shunting block; a flexible swing plate is slidably connected into the second piston cavity; and the flexible swing plate is arranged at the bottom of the shunting block, so that when the solution flows from the interior of the shunting ring from top to bottom, the flexible swing plate swings along with the solution, and then the solution is stirred and mixed for multiple times when passing through the bottom of the shunting block, so that the stirring and mixing speed of the whole device is further increased.

Further, a second elastic pull rope is connected between the tops of the two flexible swing plates; the second elastic pull rope bypasses the top of the swing ball and penetrates through the shunting block to be connected between the two flexible swing plates; and the second elastic pull rope is connected between the two flexible swing plates, so that when the swing ball is impacted by the solution from top to bottom, the flexible swing plate can extend out of the second piston cavity in a large amount, and then when the rotating rod rotates reversely and the flowing direction of the solution is reversed, the swing ball is impacted into the Y-shaped flow guide cavity, at the moment, the second elastic pull rope is pulled to pull the flexible swing plate into the second piston cavity, the residual length of the flexible swing plate outside the second piston cavity is reduced, and the problem that when solution flows reversely, the second piston cavity impacts the side wall of the shunting block and consequently the flexible swing plate is abraded seriously is solved, and the service life of the flexible swing plate is prolonged.

Further, the end part of the swing rod is fixedly connected with a flexible contact plate; an elastic plate is fixedly connected between the flexible contact plate and the swing rod; and the flexible contact plate is arranged at the end part of the swing rod, a larger contact area can be achieved when the swing rod abuts against the second magnet, so that the vibration effect of the second magnet can greatly act on the swing rod, meanwhile, the contact area of the second magnet and the swing rod is increased, and the problem that the position of the second magnet is abraded seriously due to long-time contact between the swing rod and the second magnet can be reduced.

The present disclosure further provides a processing technology of a gel microsphere material; and the processing technology uses the processing equipment of the gel microsphere material, comprising the following steps:

S1, vacuumizing the interior of a mixing barrel, then filling inert gas, and sealing the mixing barrel after filling is completed;

S2, filling raw materials needing to be mixed into the mixing barrel from a feeding port, and when the top of the liquid level of the raw materials in the mixing barrel overflows the top of the shunting ring, stopping injecting the raw materials needing to be mixed; and S3, turning on a power supply of the processing equipment, enabling a fan-shaped impeller to rotate at a constant speed in the mixing barrel at normal temperature, standing for 0.5 hour after the raw materials in the mixing barrel are uniformly stirred, and thus obtaining a microsphere primary blank solution.

The present disclosure has the following beneficial effects:

Firstly, according to the processing equipment and the processing technology of a gel microsphere material provided by the present discourse, the gas conveying pipe is arranged at the bottom of the mixing barrel to inflate the raw material solution in the mixing barrel, when bubbles float in the solution, the solution can be stirred, and then under the cooperation of the fan-shaped impeller at the bottom of the rotating rod, the raw material solution of the gel microsphere material is stirred more quickly and more uniformly in the mixing barrel compared with the raw material solution only stirred by the fan-shaped impeller.

Secondly, the swing rod is hinged to the interior of the shunting ring, so that the solution can impact the flow guide plate while flowing in the shunting ring, the swing rod is transversely arranged in the middle of the shunting ring, and at the moment, the flow guide plate shunts the solution flowing through the shunting ring, so that the solution flowing through the shunting ring is mixed at the second time; at the moment, the other end of the swing rod is in contact with the second magnet, so that the vibration amplitude of the second magnet is reduced, but the vibration effect can be directly transmitted to the shunting ring and the flow guide plate, so that the vibration of the shunting ring is more stable; moreover, the flow guide plate can vibrate together, so that the solution flowing through the flow guide plate can be vibrated and mixed for multiple times; the mixing speed and the mixing uniformity of the solution are further improved; meanwhile, when the rotating rod rotates reversely, the solution in the mixing barrel can flow reversely, and then the solution in the mixing barrel can flow upwards; at the moment, the swing rod is pushed, the other end of the swing rod leaves the second magnet, and the shaking amplitude of the second magnet in the cavity is larger; and bubbles in the solution in the mixing barrel are vibrated out, so that the volume of residual bubbles in the solution after the solution is mixed is reduced.

Thirdly, the flexible swing plate is arranged at the bottom of the shunting block, so that when the solution flows from the interior of the shunting ring from top to bottom, the flexible swing plate swings along with the solution, and then the solution is stirred and mixed for multiple times when passing through the bottom of the shunting block, so that the stirring and mixing speed of the whole device is further increased.

BRIEF DESCRIPTION OF THE DRAWINGS

Attached figures, which form a part of the description and are provided for further understanding of the present disclosure, show the preferred embodiments of the present disclosure, and explain the principle of the present disclosure together with the description, but not by way of limitation with regard to the claimed disclosure. In the attached figures.

FIG. 7 is a flow diagram of a processing technology in the present disclosure.

Reference signs in the attached figures:

1, mixing barrel; 11, rotating rod; 12, gas conveying pipe; 13, shunting ring; 14, fan-shaped impeller; 15, flow guide block; 2, first magnet; 21, cavity; 22, second magnet; 23, rubber cushion block; 3, swing rod; 31, flow guide plate; 4, first piston cavity; 41, piston rod; 42, shunting block; 43, Y-shaped flow guide cavity; 5, swing ball; 51, first elastic pull rope; 6, second piston cavity; 61, flexible swing plate; 7, second elastic pull rope; 8, flexible contact plate; and 81, elastic plate.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The specific embodiments are given as follows:

Embodiment I

Figure 4:
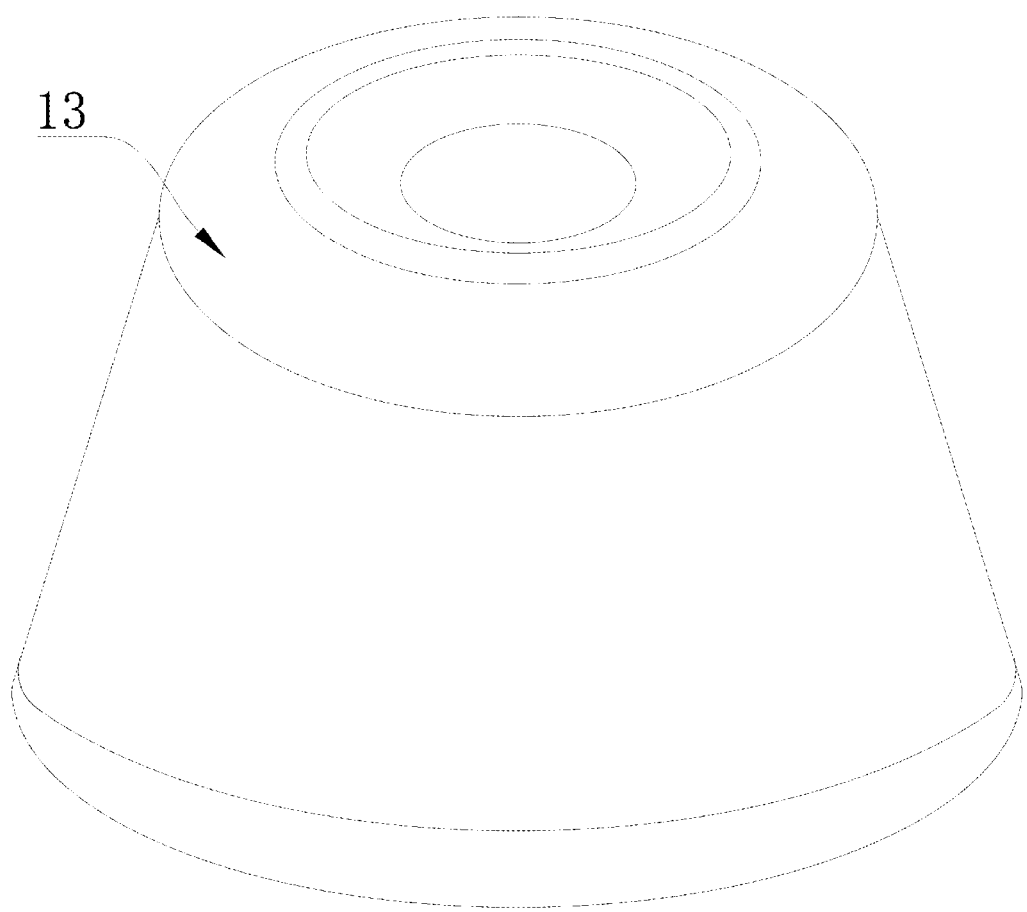
FIG. 4 is a structural schematic diagram of a shunting ring.
Figure 5:
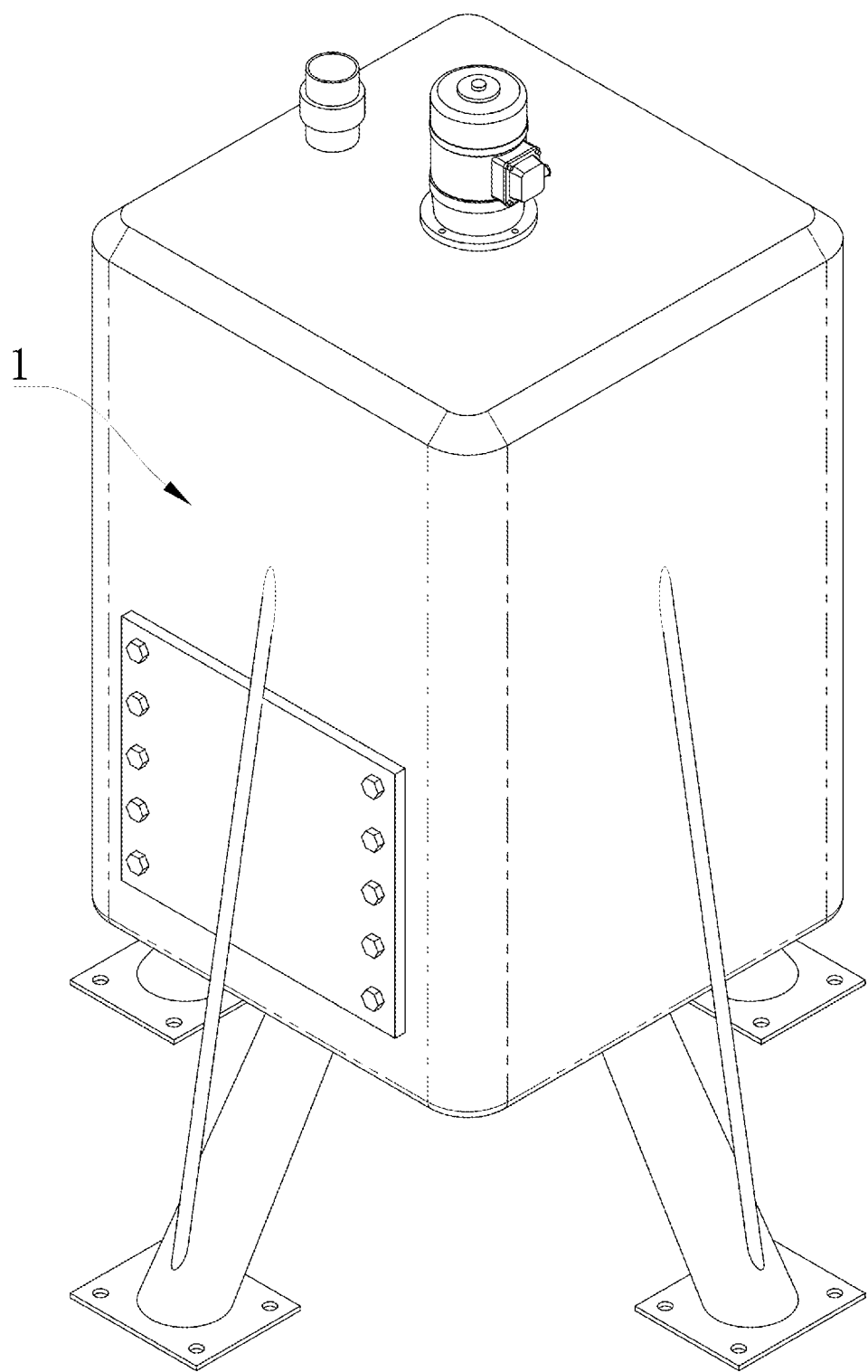
FIG. 5 is a stereo view of the present disclosure.

Referring to FIG. 1 to FIG. 5, processing equipment of a gel microsphere material specifically comprises a mixing barrel 1, wherein a motor is installed at the top of the mixing barrel 1; a rotating rod 11 is arranged in the mixing barrel 1; the rotating rod 11 is fixedly connected to the output end of the motor; the bottom of the rotating rod 11 communicates with a gas conveying pipe 12; a shunting ring 13 is fixedly connected to the inner side wall of the mixing barrel 1; and the middle part of the rotating rod 11 penetrates through the shunting ring 13, and the bottom end of the rotating rod 11 extends to the bottom of the shunting ring 13. Specifically, as shown in FIG. 4, the shunting ring 13 is located in the mixing barrel 1 and is circumferentially arranged in the mixing barrel 1; a fan-shaped impeller 14 is fixedly connected to the bottom of the rotating rod 11, the rotating rod 11 penetrates through the shunting ring 13, and the fan-shaped impeller 14 is located at the lower end of the shunting ring 13; the fan-shaped impeller 14 is of a spiral structure and can have a guiding effect on a raw material solution of a gel microsphere material in the mixing barrel 1 in the rotary stirring process.

The middle part of the rotating rod 11 is fixedly connected with a first magnet 2; a cavity 21 is formed in the shunting ring 13; a second magnet 22 is fixedly connected into the cavity 21 through an elastic pull rope; a rubber cushion block 23 is fixedly connected into the shunting ring 13; a swing rod 3 is hinged to the inner side wall of the shunting ring 13; one side of the swing rod 3 extends into the cavity 21; the end part of the swing rod 3 is fixedly connected with a flow guide plate 31; and magnetic poles of the first magnet 2 and the second magnet 22 are arranged correspondingly and can be different at opposite postures, so that mutual attraction or mutual exclusion is achieved. Specifically, the first magnet 2 is horizontally placed in the middle of the rotating rod 11, so that the magnetic pole of the first magnet 2 is horizontally distributed, that is, one end in the horizontal direction is an S pole, and the other end in the horizontal direction is an N pole.

Figure 1:
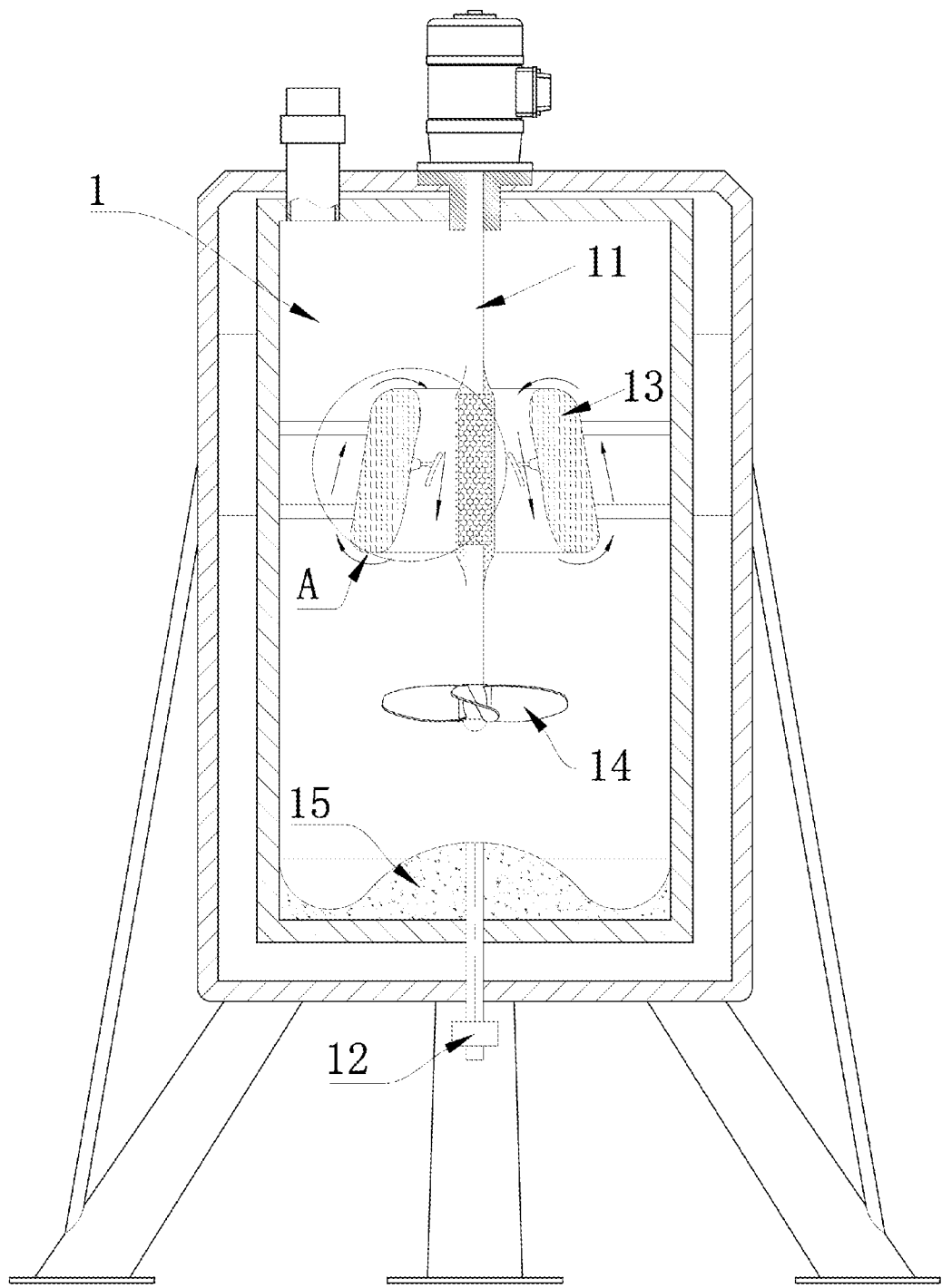
FIG. 1 is a section view of the present disclosure.
Figure 2:
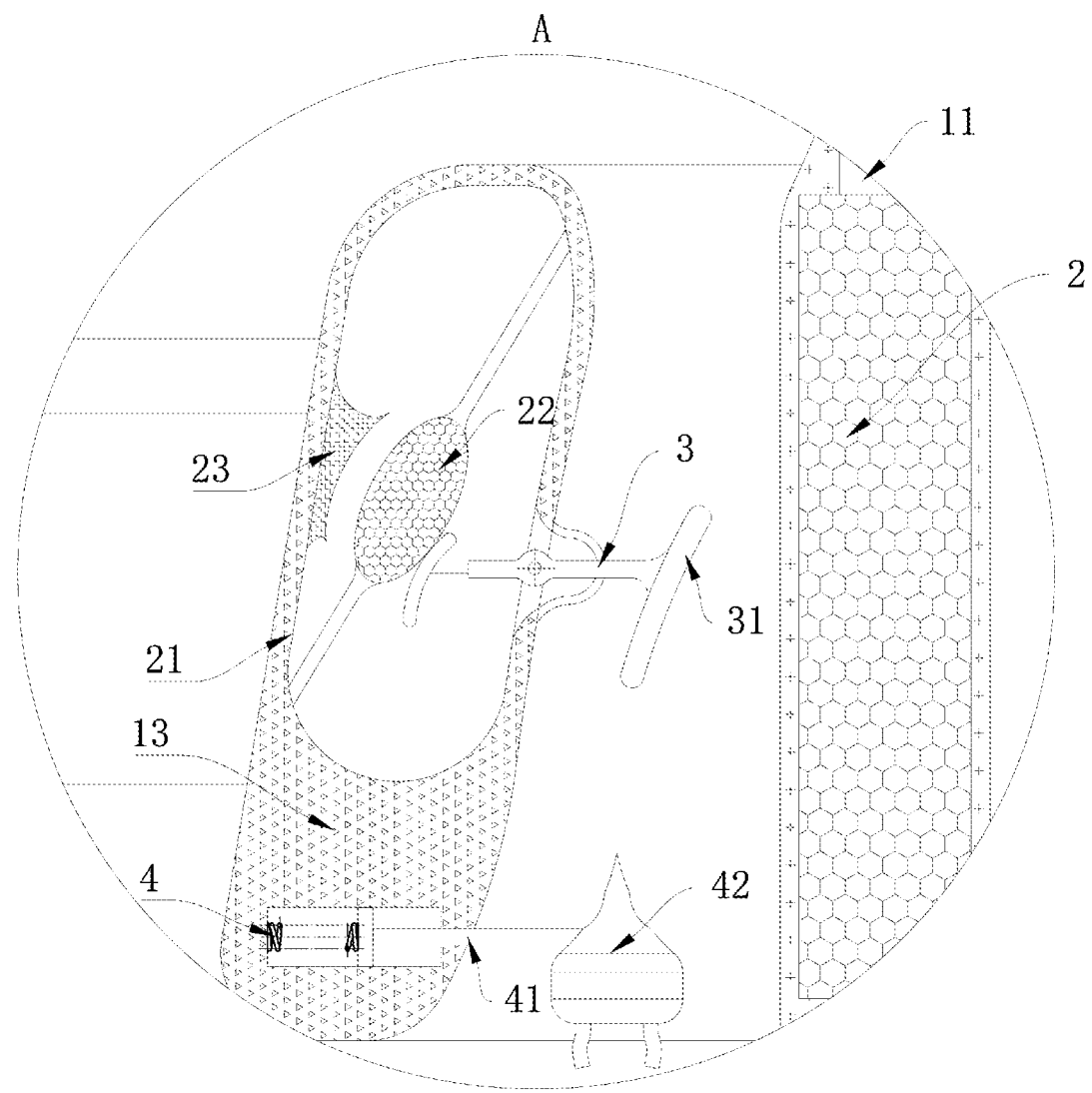
FIG. 2 is a local enlarged view at the position of A in FIG. 1.
Figure 3:
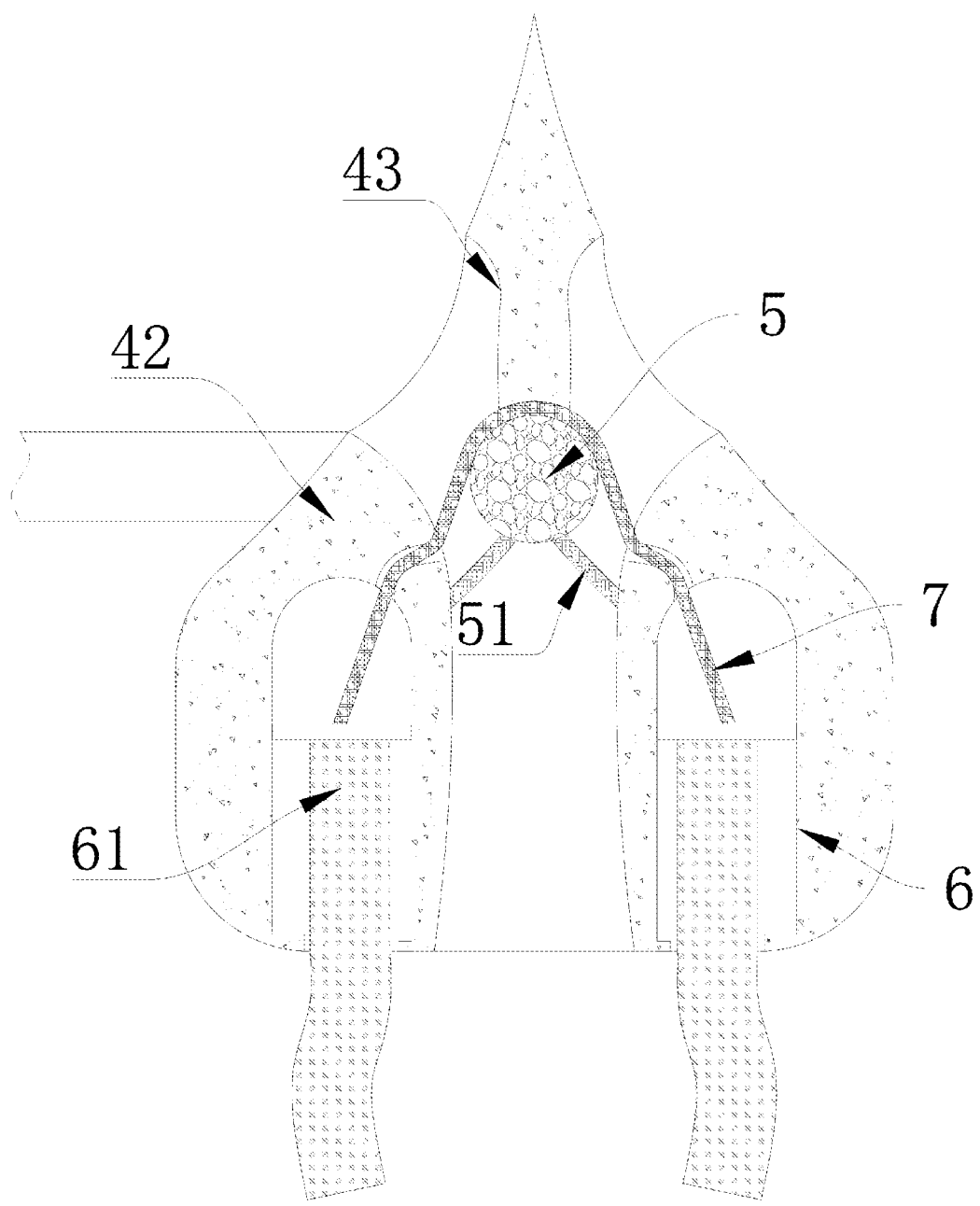
FIG. 3 is a section view of a shunting block.

Production raw materials are added into the mixing barrel 1 from a feeding port of the mixing barrel 1, meanwhile, the liquid level of the added production raw materials is higher than the shunting ring 13, then the motor at the top of the mixing barrel 1 is opened, the rotating rod 11 drives the fan-shaped impeller 14 to rotate clockwise in the mixing barrel 1, at the moment, the raw material solution in the mixing barrel 1 flows in the shunting ring 13 from top to bottom, and then the solution flows from bottom to top from the periphery of the shunting ring 13 and then passes over the top of the shunting ring 13 to enter the shunting ring 13 again; specifically as shown in FIG. 1 in the direction of arrow, repeated cycles are achieved; meanwhile, a valve of the gas conveying pipe 12 is opened, gas enters the bottom of the mixing barrel 1, at the moment, the gas can float from bottom to top in the raw materials, the raw materials in the mixing barrel 1 are stirred, and the gas conveying pipe 12 is arranged at the bottom of the mixing barrel 1 to inflate the raw material solution in the mixing barrel 1; and when bubbles float in the solution, the solution can be stirred, and under the cooperation with the fan-shaped impeller 14 at the bottom of the rotating rod 11, the raw material solution of the gel microsphere material is stirred more quickly and more uniformly in the mixing barrel 1 compared with the raw material solution only stirred by the fan-shaped impeller 14.

When the motor at the top of the mixing barrel 1 rotates reversely, the rotating direction of the fan-shaped impeller 14 in the mixing barrel 1 rotates reversely at the same time, at the moment, the fan-shaped impeller 14 sucks the raw material solution in the mixing barrel 1 from the bottom of the fan-shaped impeller 14 and sends the raw material solution to the interior of the shunting ring 13, and the flowing direction of the raw material solution for preparing microspheres can be reversed in the mixing barrel 1.

Meanwhile, in the rotating process of the rotating rod 11, when the first magnet 2 rotates, different magnetic poles can be switched to influence the second magnet 22, and when the first magnet 2 rotates to the side where the first magnet 2 and the second magnet 22 are attracted to each other, the second magnet 22 can be close to the rotating rod 11 in the cavity 21; then, when the first magnet 2 rotates to the side where the first magnet 2 and the second magnet 22 are mutually exclusive, the second magnet 22 moves towards the side far away from the rotating rod 11 in the cavity 21, the second magnet 22 vibrates in the shunting ring 13 under the multiple times of reciprocation, and at the moment, the shunting ring 13 vibrates and mixes the solution in the mixing barrel 1; meanwhile, bubbles floating from the gas conveying pipe 12 cannot be easily adsorbed on the shunting ring 13, and then the problem that the stirring effect is affected is solved; and through the arrangement of the rubber cushion block 23, when the second magnet 22 vibrates, the second magnet 22 and the rubber cushion block 23 collide and contact with each other, so that the shaking effect generated by the second magnet 22 is directly conducted to the shunting ring 13.

The swing rod 3 is hinged to the interior of the shunting ring 13, so that the solution can impact the flow guide plate 31 while flowing in the shunting ring 13, the swing rod 3 is transversely arranged in the middle of the shunting ring 13, and at the moment, the flow guide plate 31 shunts the solution flowing through the shunting ring 13, so that the solution flowing through the shunting ring 13 is mixed at the second time; at the moment, the other end of the swing rod 3 is in contact with the second magnet 22, so that the vibration amplitude of the second magnet 22 is reduced, but the vibration effect can be directly transmitted to the shunting ring 13 and the flow guide plate 31, so that the vibration of the shunting ring 13 is more stable; moreover, the flow guide plate 31 can vibrate together, so that the solution flowing through the flow guide plate 31 can be vibrated and mixed for multiple times; the mixing speed and the mixing uniformity of the solution are further improved; meanwhile, when the rotating rod 11 rotates reversely and the gas conveying pipe 12 stops conveying gas, the flowing direction of the solution in the shunting ring 13 is opposite to the above flowing direction, at the moment, the swing rod 3 is pushed, the other end of the swing rod 3 leaves the second magnet 22, and the shaking amplitude of the second magnet 22 in the cavity 21 is larger; and bubbles in the solution in the mixing barrel 1 are vibrated out, so that the volume of residual bubbles in the solution after the solution is mixed is reduced.

As shown in FIG. 1, flow guide blocks 15 are fixedly connected to the inner side wall of the bottom of the mixing barrel 1; the flow guide blocks 15 are symmetrically arranged at the bottom of the mixing barrel 1; and a U-shaped groove is formed in the center of the top of the flow guide block 15, in the process that the raw material solution of the microspheres flows in the mixing barrel 1, the solution can realize up-and-down backflow in the mixing barrel 1 under the guidance of the flow guide blocks 15 at the bottom of the mixing barrel 1, so that when the solution flows up and down in the mixing barrel 1, part of the solution rotates at the bottom boundary of the mixing barrel 1 to cause the problem that the solution in the mixing barrel 1 can not be fully mixed.

Further, a first piston cavity 4 is formed in the shunting ring 13; a piston rod 41 is slidably connected into the first piston cavity 4; the end part of the piston rod 41 faces the rotating rod 11; the end part of the piston rod 41 is fixedly connected with a shunting block 42; a Y-shaped flow guide cavity 43 is formed in the shunting block 42; the shunting block 42 is arranged on the inner side wall of the bottom of the shunting ring 13, when the solution flows, the solution can be dispersed at an outlet in the bottom of the shunting ring 13, when the liquid flowing downwards from the shunting ring 13 impacts the fan-shaped impeller 14, multiple beams of solution are formed, and meanwhile, vibration of the shunting ring 13 is transmitted out when the first magnet 2 rotates, the shunting block 42 can slightly shake, the solution flowing through the shunting block 42 can be mixed for multiple times, and further, the solution can be mixed more uniformly when flowing downwards from the shunting ring 13; the Y-shaped flow guide cavity 43 is formed in the shunting block 42, the two ends of the top of the Y-shaped flow guide cavity 43 are formed in the two sides of the shunting block 42, then an outlet is formed in the middle of the shunting block 42 in a fusion mode, and the outlet communicates with the bottom of the shunting block 42.

A swing ball 5 is arranged in the Y-shaped flow guide cavity 43; a first elastic pull rope 51 is connected between the swing ball 5 and the Y-shaped flow guide cavity 43; the swing ball 5 is arranged in the Y-shaped flow guide cavity 43, when the solution flows in from the top of the Y-shaped flow guide cavity 43 and flows out from the bottom of the Y-shaped flow guide cavity 43, the swing ball 5 rushes out from the bottom of the Y-shaped flow guide cavity 43, and at the moment, the swing ball 5 swings at the bottom of the Y-shaped flow guide cavity 43; meanwhile, the swing ball 5 also shakes at the bottom of the shunting block 42 while the shunting block 42 shakes; and the solution flowing out from the bottom of the Y-shaped flow guide cavity 43 is vibrated and mixed, and the mixing uniformity of all raw materials in the solution is accelerated.

A plurality of groups of second piston cavities 6 are formed in the shunting block 42; a flexible swing plate 61 is slidably connected into the second piston cavity 6; and the flexible swing plate 61 is arranged at the bottom of the shunting block 42, so that when the solution flows from the interior of the shunting ring 13 from top to bottom, the flexible swing plate 61 swings along with the solution, and then the solution is stirred and mixed for multiple times when passing through the bottom of the shunting block 42, so that the stirring and mixing speed of the whole device is further increased.

A second elastic pull rope 7 is connected between the tops of the two flexible swing plates 61; the second elastic pull rope 7 bypasses the top of the swing ball 5 and penetrates through the shunting block 42 to be connected between the two flexible swing plates 61; and the second elastic pull rope 7 is connected between the two flexible swing plates 61, so that when the swing ball 5 is impacted by the solution from top to bottom, the flexible swing plate 61 can extend out of the second piston cavity 6 in a large amount, and then when the rotating rod 11 rotates reversely and the flowing direction of the solution is reversed, the swing ball 5 is impacted into the Y-shaped flow guide cavity 43, at the moment, the second elastic pull rope 7 is pulled to pull the flexible swing plate 61 into the second piston cavity 6, the residual length of the flexible swing plate 61 outside the second piston cavity 6 is reduced, and the problem that when solution flows reversely, the second piston cavity 6 impacts the side wall of the shunting block 42 and consequently the flexible swing plate 61 is abraded seriously is solved, and the service life of the flexible swing plate 61 is prolonged.

Embodiment II

Figure 6:
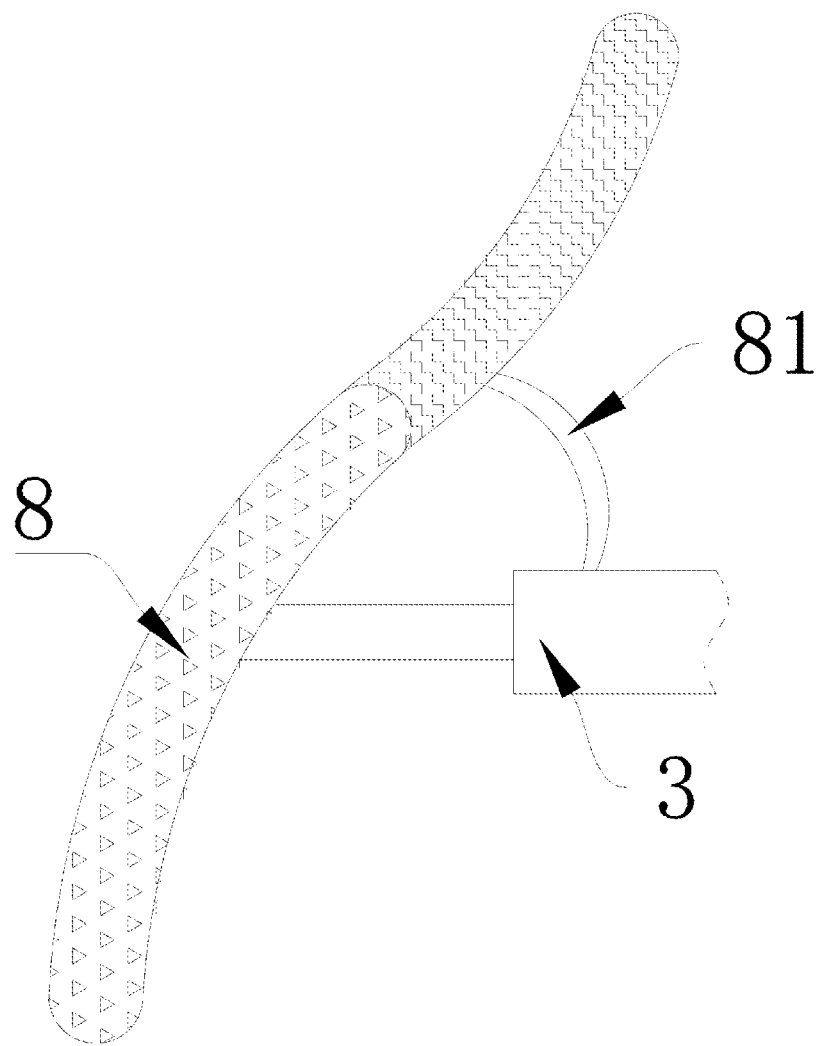
FIG. 6 is a structural schematic diagram of a flexible contact plate.

Further, as shown in FIG. 6, contrasted with the first embodiment, as the other embodiment of the present disclosure, the end part of the swing rod 3 is fixedly connected with a flexible contact plate 8; an elastic plate 81 is fixedly connected between the flexible contact plate 8 and the swing rod 3; and the flexible contact plate 8 is arranged at the end part of the swing rod 3, a larger contact area can be achieved when the swing rod 3 abuts against the second magnet 22, so that the vibration effect of the second magnet 22 can greatly act on the swing rod 3, meanwhile, the contact area of the second magnet 22 and the swing rod 3 is increased, and the problem that the position of the second magnet 22 is abraded seriously due to long-time contact between the swing rod 3 and the second magnet 2 can be reduced.

As shown in FIG. 7, the present disclosure further provides a processing technology of a gel microsphere material; and the processing technology uses the processing equipment of the gel microsphere material, comprising the following steps:

S1, vacuumizing the interior of a mixing barrel 1, then filling inert gas, and sealing the mixing barrel 1 after filling is completed, wherein the mixing barrel 1 is firstly treated by filling inert gas, so that the gas environment in the mixing barrel 1 is relatively stable, the whole mixing reaction process is relatively stable after the raw materials of the microsphere material are placed in the mixing barrel 1, and the problem that the reaction mixture has impurities due to the fact that additional air impurities participate in the reaction is reduced;

S2, filling raw materials needing to be mixed into the mixing barrel 1 from a feeding port, and when the top of the liquid level of the raw materials in the mixing barrel 1 overflows the top of the shunting ring 13, stopping injecting the raw materials needing to be mixed, wherein the height of the liquid level for filling the raw materials of the microsphere material into the mixing barrel 1 is higher than the height of the top of the shunting ring 13, so that when the raw materials of the microsphere material are stirred and mixed by the fan-shaped impeller 14, the raw materials of the microsphere material in the mixing barrel 1 can normally cross over the top of the shunting ring 13 and then enter the shunting ring 13 to flow back; and S3, turning on a power supply of the processing equipment, enabling a fan-shaped impeller 14 to rotate at a constant speed in the mixing barrel 1 at normal temperature, standing for 0.5 hour after the raw materials in the mixing barrel 1 are uniformly stirred, and thus obtaining a microsphere primary blank solution, wherein during stirring, the fan-shaped impeller 14 is used for stirring and mixing the raw materials of the microsphere material at a stable rotating speed at normal temperature, so that the raw materials of the microsphere material can be mixed at a uniform reaction speed, and then the difference of reaction results of all the microspheres is reduced.

The working process of the embodiment is as follows: production raw materials are added into the mixing barrel 1 from a feeding port of the mixing barrel 1, meanwhile, the liquid level of the added production raw materials is higher than the shunting ring 13, then the motor at the top of the mixing barrel 1 is opened, the rotating rod 11 drives the fan-shaped impeller 14 to rotate clockwise in the mixing barrel 1, at the moment, a raw material solution in the mixing barrel 1 flows in the shunting ring 13 from top to bottom, and then repeated cycles are achieved; meanwhile, a valve of the gas conveying pipe 12 is opened, gas enters the bottom of the mixing barrel 1, at the moment, the gas can float from bottom to top in the raw materials, the raw materials in the mixing barrel 1 are stirred, and the gas conveying pipe 12 is arranged at the bottom of the mixing barrel 1 to inflate the raw material solution in the mixing barrel 1; and when bubbles float in the solution, the solution can be stirred, and under the cooperation with the fan-shaped impeller 14 at the bottom of the rotating rod 11, the raw material solution of the gel microsphere material is stirred more quickly and more uniformly in the mixing barrel 1 compared with the raw material solution only stirred by the fan-shaped impeller 14.

When the motor at the top of the mixing barrel 1 rotates reversely, the rotating direction of the fan-shaped impeller 14 in the mixing barrel 1 rotates reversely at the same time, at the moment, the fan-shaped impeller 14 sucks the raw material solution in the mixing barrel 1 from the bottom of the fan-shaped impeller 14 and sends the raw material solution to the interior of the shunting ring 13, and the flowing direction of the raw material solution for preparing microspheres can be reversed in the mixing barrel 1.

Meanwhile, in the rotating process of the rotating rod 11, when the first magnet 2 rotates, different magnetic poles can be switched to influence the second magnet 22, and when the first magnet 2 rotates to the side where the first magnet 2 and the second magnet 22 are attracted to each other, the second magnet 22 can be close to the rotating rod 11 in the cavity 21; then, when the first magnet 2 rotates to the side where the first magnet 2 and the second magnet 22 are mutually exclusive, the second magnet 22 moves towards the side far away from the rotating rod 11 in the cavity 21, the second magnet 22 vibrates in the shunting ring 13 under the multiple times of reciprocation, and at the moment, the shunting ring 13 vibrates and mixes the solution in the mixing barrel 1; meanwhile, bubbles floating from the gas conveying pipe 12 cannot be easily adsorbed on the shunting ring 13, and then the problem that the stirring effect is affected is solved; and through the arrangement of the rubber cushion block 23, when the second magnet 22 vibrates, the second magnet 22 and the rubber cushion block 23 collide and contact with each other, so that the shaking effect generated by the second magnet 22 is directly conducted to the shunting ring 13.

A swing rod 3 is hinged to the interior of the shunting ring 13, so that the solution can impact the flow guide plate 31 while flowing in the shunting ring 13, the swing rod 3 is transversely arranged in the middle of the shunting ring 13, and at the moment, the flow guide plate 31 shunts the solution flowing through the shunting ring 13, so that the solution flowing through the shunting ring 13 is mixed at the second time; at the moment, the other end of the swing rod 3 is in contact with the second magnet 22, so that the vibration amplitude of the second magnet 22 is reduced, but the vibration effect can be directly transmitted to the shunting ring 13 and the flow guide plate 31, so that the vibration of the shunting ring 13 is more stable; moreover, the flow guide plate 31 can vibrate together, so that the solution flowing through the flow guide plate 31 can be vibrated and mixed for multiple times; the mixing speed and the mixing uniformity of the solution are further improved; meanwhile, when the rotating rod 11 rotates reversely and the gas conveying pipe 12 stops conveying gas, the flowing direction of the solution in the shunting ring 13 is opposite to the above flowing direction, at the moment, the swing rod 3 is pushed, the other end of the swing rod 3 leaves the second magnet 22, and the shaking amplitude of the second magnet 22 in the cavity 21 is larger; and bubbles in the solution in the mixing barrel 1 are vibrated out, so that the volume of residual bubbles in the solution after the solution is mixed is reduced.

In the process that the raw material solution of the microspheres flows in the mixing barrel 1, the solution can realize up-and-down backflow in the mixing barrel 1 under the guidance of the flow guide blocks 15 at the bottom of the mixing barrel 1, so that when the solution flows up and down in the mixing barrel 1, part of the solution rotates at the bottom boundary of the mixing barrel 1 to cause the problem that the solution in the mixing barrel 1 can not be fully mixed.

A shunting block 42 is arranged on the inner side wall of the bottom of the shunting ring 13, when the solution flows, the solution can be dispersed at an outlet in the bottom of the shunting ring 13, when the liquid flowing downwards from the shunting ring 13 impacts the fan-shaped impeller 14, multiple beams of solution are formed, and meanwhile, vibration of the shunting ring 13 is transmitted out when the first magnet 2 rotates, the shunting block 42 can slightly shake, the solution flowing through the shunting block 42 can be mixed for multiple times, and further, the solution can be mixed more uniformly when flowing downwards from the shunting ring 13; the Y-shaped flow guide cavity 43 is formed in the shunting block 42, the two ends of the top of the Y-shaped flow guide cavity 43 are formed in the two sides of the shunting block 42, then an outlet is formed in the middle of the shunting block 42 in a fusion mode, and the outlet communicates with the bottom of the shunting block 42.

A swing ball 5 is arranged in the Y-shaped flow guide cavity 43, when the solution flows in from the top of the Y-shaped flow guide cavity 43 and flows out from the bottom of the Y-shaped flow guide cavity 43, the swing ball 5 rushes out from the bottom of the Y-shaped flow guide cavity 43, and at the moment, the swing ball 5 swings at the bottom of the Y-shaped flow guide cavity 43; meanwhile, the swing ball 5 also shakes at the bottom of the shunting block 42 while the shunting block 42 shakes; and the solution flowing out from the bottom of the Y-shaped flow guide cavity 43 is vibrated and mixed, and the mixing uniformity of all raw materials in the solution is accelerated.

When the solution flows from the interior of the shunting ring 13 from top to bottom, the flexible swing plate 61 swings along with the solution, and then the solution is stirred and mixed for multiple times when passing through the bottom of the shunting block 42, so that the stirring and mixing speed of the whole device is further increased.

A second elastic pull rope 7 is connected between the two flexible swing plates 61, so that when the swing ball 5 is impacted by the solution from top to bottom, the flexible swing plate 61 can extend out of the second piston cavity 6 in a large amount, and then when the rotating rod 11 rotates reversely and the flowing direction of the solution is reversed, the swing ball 5 is impacted into the Y-shaped flow guide cavity 43, at the moment, the second elastic pull rope 7 is pulled to pull the flexible swing plate 61 into the second piston cavity 6, the residual length of the flexible swing plate 61 outside the second piston cavity 6 is reduced, and the problem that when solution flows reversely, the second piston cavity 6 impacts the side wall of the shunting block 42 and consequently the flexible swing plate 61 is abraded seriously is solved, and the service life of the flexible swing plate 61 is prolonged.

The flexible contact plate 8 is arranged at the end part of the swing rod 3, a larger contact area can be achieved when the swing rod 3 abuts against the second magnet 22, so that the vibration effect of the second magnet 22 can greatly act on the swing rod 3, meanwhile, the contact area of the second magnet 22 and the swing rod 3 is increased, and the problem that the position of the second magnet 22 is abraded seriously due to long-time contact between the swing rod 3 and the second magnet 22 can be reduced.

In the description of the specification, the description of the reference terms such as "one embodiment", "some embodiments", "example", "specific example" or "some examples" indicates to be contained in at least one embodiment or example of the present disclosure in combination with specific characteristics, structures, materials or characteristics described by the embodiment or example. In the specification, schematic expression of the above terms does not necessarily refer to the same embodiment or example. Moreover, the described specific features, structures, materials or characteristics can be combined in any of one or more embodiments or examples appropriately.

The basic principles, principal features and advantages of the present disclosure are shown and described above. Those skilled in the art should understand that the present disclosure is not limited by the above-described embodiments, the above-described embodiments and specification are merely illustrative of the principles of the present disclosure, various changes and modifications may occur to the present disclosure under the premise of without departing from the spirit and scope of the present disclosure, and these changes and modifications fall within the scope of the present disclosure as claimed.

What is claimed is:

1. Processing equipment of a gel microsphere material, comprising a mixing barrel, wherein a motor is installed at the top of the mixing barrel; a rotating rod is arranged in the mixing barrel; the rotating rod is fixedly connected to the output end of the motor; a gas conveying pipe is arranged at the bottom of the mixing barrel; a shunting ring is fixedly connected to the inner side wall of the mixing barrel; the bottom of the rotating rod penetrates through the shunting ring, and the bottom end of the rotating rod extends to the bottom of the shunting ring; the bottom of the rotating rod is provided with a fan-shaped impeller;

the middle part of the rotating rod is fixedly connected with a first magnet; a cavity is formed in the shunting ring; a second magnet is arranged in the cavity through an elastic pull rope; magnetic poles of the first magnet and the second magnet are arranged correspondingly, and a rubber cushion block is fixedly connected into the shunting ring; a swing rod is hinged to the inner side wall of the shunting ring; one side of the swing rod extends into the cavity; and the end part of the swing rod is fixedly connected with a flow guide plate;

flow guide blocks are fixedly connected to the inner side wall of the bottom of the mixing barrel; and flow guide blocks are symmetrically arranged at the bottom of the mixing barrel.

2. The processing equipment of a gel microsphere material according to claim 1, wherein a first piston cavity is formed in the shunting ring; a piston rod is slidably connected into the first piston cavity; the end part of the piston rod faces the rotating rod; the end part of the piston rod is fixedly connected with a shunting block; and a Y-shaped flow guide cavity is formed in the shunting block.

3. The processing equipment of a gel microsphere material according to claim 2, wherein a swing ball is arranged in the Y-shaped flow guide cavity; and a first elastic pull rope is connected between the swing ball and the Y-shaped flow guide cavity.

4. The processing equipment of a gel microsphere material according to claim 3, wherein a plurality of groups of second piston cavities are formed in the shunting block; and a flexible swing plate is slidably connected into the second piston cavity.

5. The processing equipment of a gel microsphere material according to claim 4, wherein a second elastic pull rope is connected between the tops of the two flexible swing plates; and the second elastic pull rope bypasses the top of the swing ball and penetrates through the shunting block to be connected between the two flexible swing plates.

6. A processing technology of a gel microsphere material, wherein the processing technology uses the processing equipment of a gel microsphere material according to claim 1, and the specific process comprises the following steps:

S1, vacuumizing the interior of a mixing barrel, then filling inert gas, and sealing the mixing barrel after filling is completed;

S2, filling raw materials needing to be mixed into the mixing barrel from a feeding port, and when the top of the liquid level of the raw materials in the mixing barrel overflows the top of the shunting ring, stopping injecting the raw materials needing to be mixed; and S3, turning on a power supply of the processing equipment, enabling a fan-shaped impeller to rotate at a constant speed in the mixing barrel at normal temperature, standing for 0.5 hour after the raw materials in the mixing barrel are uniformly stirred, and thus obtaining a microsphere primary blank solution.

7. The processing technology of a gel microsphere material according to claim 6, wherein a first piston cavity is formed in the shunting ring; a piston rod is slidably connected into the first piston cavity; the end part of the piston rod faces the rotating rod; the end part of the piston rod is fixedly connected with a shunting block; and a Y-shaped flow guide cavity is formed in the shunting block.

8. The processing technology of a gel microsphere material according to claim 7, wherein a swing ball is arranged in the Y-shaped flow guide cavity; and a first elastic pull rope is connected between the swing ball and the Y-shaped flow guide cavity.

9. The processing technology of a gel microsphere material according to claim 8, wherein a plurality of groups of second piston cavities are formed in the shunting block; and a flexible swing plate is slidably connected into the second piston cavity.

10. The processing technology of a gel microsphere material according to claim 9, wherein a second elastic pull rope is connected between the tops of the two flexible swing plates; and the second elastic pull rope bypasses the top of the swing ball and penetrates through the shunting block to be connected between the two flexible swing plates.

11. The processing technology of a gel microsphere material according to claim 10, wherein the end part of the swing rod is fixedly connected with a flexible contact plate; and an elastic plate is fixedly connected between the flexible contact plate and the swing rod.

* * * * *